(12) United States Patent
Carpenter et al.

(10) Patent No.: US 7,882,738 B2
(45) Date of Patent: Feb. 8, 2011

(54) WHEEL BALANCER HAVING LASER-ASSISTED WEIGHT PLACEMENT SYSTEM

(75) Inventors: David M. Carpenter, Brentwood, TN (US); Charles L. Cunningham, Nashville, TN (US); Don A. Truex, Murfreesboro, TN (US); Brian W. LaBorde, Brentwood, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 910 days.

(21) Appl. No.: 11/652,366

(22) Filed: Jan. 11, 2007

(65) Prior Publication Data

US 2007/0175275 A1    Aug. 2, 2007

Related U.S. Application Data

(60) Provisional application No. 60/758,467, filed on Jan. 12, 2006.

(51) Int. Cl.
  *G01M 1/16* (2006.01)
(52) U.S. Cl. .................................. 73/460; 301/5.21
(58) Field of Classification Search .............. 73/460, 73/66, 487; 301/5.21; 700/279
  See application file for complete search history.

(56) References Cited

U.S. PATENT DOCUMENTS

| | | | |
|---|---|---|---|
| 4,143,970 A * | 3/1979 | Lill | ............................ 356/155 |
| 4,338,818 A | 7/1982 | Hill et al. | |
| 4,357,832 A * | 11/1982 | Blackburn et al. | ............. 73/462 |
| 4,480,471 A * | 11/1984 | Kogler et al. | .................. 73/462 |
| 5,303,463 A * | 4/1994 | Pollard | ......................... 29/705 |
| 5,311,777 A | 5/1994 | Cunningham et al. | |
| 5,337,256 A | 8/1994 | Cunningham et al. | |
| 5,591,909 A * | 1/1997 | Rothamel et al. | ............. 73/462 |
| 5,969,247 A | 10/1999 | Carter et al. | |
| 6,244,108 B1 * | 6/2001 | McInnes et al. | ................ 73/462 |
| 6,484,574 B1 * | 11/2002 | Douglas et al. | ................ 73/462 |
| 6,732,585 B1 | 5/2004 | Cunningham et al. | |
| 6,983,656 B2 * | 1/2006 | Cullum et al. | ................. 73/487 |
| 7,065,444 B2 * | 6/2006 | Braghiroli | .................... 701/124 |
| 7,191,651 B2 * | 3/2007 | Douglas et al. | ............... 73/462 |
| 7,199,873 B2 * | 4/2007 | Braghiroli | .............. 356/139.09 |
| 7,199,880 B2 | 4/2007 | Braghiroli | |

(Continued)

OTHER PUBLICATIONS

Brochure entitled John Bean BFH 1000 Two-in-One Technology, Oct. 2004.

*Primary Examiner*—Hezron Williams
*Assistant Examiner*—Samir M Shah
(74) *Attorney, Agent, or Firm*—Nelson Mullins Riley & Scarborough LLP

(57) ABSTRACT

A wheel balancer for balancing a wheel having a rim and tire. The wheel balancer comprises a chassis and a driven shaft extending away from the chassis for rotating the wheel. An A&D arm, pivotal and axially extendible with respect to the chassis, is also provided. A first laser device is operable to produce a laser spot at a desired weight placement location on an inner surface of the rim. The first laser device is manipulable by an operator to move the laser spot to the desired weight placement location. A second laser device is attached to the A&D arm and movable therewith. The second laser device produces a visible marker on the inner surface of the rim for determining when the A&D arm is in a plane of the desired weight placement location.

18 Claims, 5 Drawing Sheets

U.S. PATENT DOCUMENTS

| | | | |
|---|---|---|---|
| 7,221,441 B2 * | 5/2007 | Douglas et al. | 356/139.09 |
| 7,320,248 B2 * | 1/2008 | Douglas | 73/459 |
| 7,328,614 B2 * | 2/2008 | Gerdes et al. | 73/461 |
| 7,574,913 B2 * | 8/2009 | Gerdes et al. | 73/468 |
| 7,584,659 B1 * | 9/2009 | Rogers et al. | 73/462 |
| 7,594,436 B2 * | 9/2009 | Gerdes et al. | 73/459 |
| 7,658,108 B2 * | 2/2010 | Douglas | 73/459 |
| 7,684,027 B2 | 3/2010 | Douglas et al. | |
| 7,686,403 B2 | 3/2010 | Douglas | |
| 2007/0175275 A1 * | 8/2007 | Carpenter et al. | 73/460 |

* cited by examiner

WHEEL BALANCER HAVING LASER-ASSISTED WEIGHT PLACEMENT SYSTEM

PRIORITY CLAIM

This application claims the benefit of provisional application Ser. No. 60/758,467, filed Jan. 12, 2006, which is relied upon and incorporated herein by reference.

BACKGROUND OF THE INVENTION

The present invention relates to the art of wheel balancers. More particularly, the present invention relates to an electro-mechanical wheel balancer having a laser-assisted weight placement system.

Electro-mechanical wheel balancers have been well known in the vehicle repair trade for many years. These machines often include a chassis in the form of a cabinet in which various components and systems are housed. An imbalanced wheel is attached to a rotatable shaft that extends from the chassis, typically using various mounting cones or other adapters. The shaft is rotatably driven by a suitable drive system (such as a direct drive motor) to create a dynamic imbalance condition. In addition, prior art balancing systems have included an A&D arm that assists in measuring the wheel and determining the locations of the corrective weights. These machines have further included sensors to detect the wheel imbalance forces and electronic circuitry to analyze the forces and display an amount of weight needed to balance the wheel.

It is well known in the art to attach corrective weights (typically clip weights) of various masses to the outer and inner flange of a wheel to balance the wheel. After spinning the wheel to determine the dynamic imbalance, if any, the wheel balancer may resolve the imbalance vector into two opposite vectors corresponding to the positions on the two wheel flanges (outer and inner) where the weights are to be placed.

When using this type of balancer, the operator defines the locations where the corrective weights can be applied by using the A&D arm. The machine then rotates the wheel mass and calculates an effective amount of corrective weight based on the available locations inputted by the user and the wheel's imbalance characteristics. Next, the operator places a corrective weight at top dead center on each of the flanges in an amount calculated by the machine.

The recent development of wheels without flanges has complicated the operator's task of installing corrective weights. When balancing wheels without flanges, the weights may need to be placed in "hidden" locations on the wheel. In many situations, one corrective weight (a clip weight) is placed on the inner flange of the wheel and another weight (an adhesive weight) is attached to the inner surface of the wheel hub in a plane just behind the spokes or center disk of the wheel. The closer proximity of the corrective planes in this configuration may require that the weights be larger and more accurately placed on the wheel.

A challenge in placing hidden weights on the inner surface of the wheel is accurately placing the weight at the location prescribed by the machine. If the adhesive weight is mislocated, then the wheel will show an imbalance when a check spin is performed. Attaching adhesive weights is also complicated by difficulties in locating the proper radial position for the clip weight on the interior flange and freeing the area of the adhesive weight of grease, typically near the 12 o'clock position on the wheel's inner surface. Because the adhesive weights are one-time use only, replacing and discarding mislocated weights can lead to additional expense. Thus, correctly placing the weight on the first attempt may help reduce time and cost.

Many attempts to solve the above-mentioned problems have been made. For example, some balancer manufacturers have provided an arm which assists in mounting the corrective adhesive weight. These systems are often cumbersome because the weight needs to be attached near the 12 o'clock position and is therefore not visible to the operator during placement.

Other prior art techniques include the following: (1) The use of a laser over the top of the tire that creates a line across the top of the tire to help the operator in placing the corrective weight at top dead center. (2) Brakes on the wheel spindle to help the operator in placement of the corrective weights at top dead center. (3) Alone or in combination with (2), a measuring arm that stops at the correct inboard outboard location to help the operator in placing the weight at top dead center. (4) An audible sound buzzer to help the operator in placing the corrective weight at the proper location. (5) An arm that places the weight on the wheel at the correct location. When the wheel stops after the first spin, the operator places the correct amount of weight in the A&D arm device and it automatically places the weight at the correct location on the wheel rim.

Another prior art method uses a laser to guide the operator to the location on the inside of the wheel where the weight is to be placed. The placement of the laser beam is accomplished with the help of a mechanical servo system. The laser is mounted to the end of a small tube that translates in and out of the inside of the wheel. The operator positions the laser with the wheel stopped before the balance spin. Just before the balance spin, the laser retracts and allows the wheel to spin. Once the balancer determines the imbalance of the wheel and the wheel stops spinning, the tube system holding the laser re-extends to the set position to assist the operator in locating the correct adhesive weight location.

SUMMARY OF THE INVENTION

The present invention recognizes and addresses various considerations of the prior art.

Accordingly, the present invention provides a wheel balancer for balancing a wheel having a rim and tire. The wheel balancer comprises a chassis and a driven shaft extending away from the chassis for rotating the wheel. A first laser device is mounted at a fixed location relative to the chassis. The first laser device is operable to produce a laser spot at a desired weight placement location on an inner surface of the rim.

The first laser device is preferably manipulable by an operator to move the laser spot to the desired weight placement location. For example, the first laser device may include a rotatable adjustment knob for moving the laser spot. In one exemplary embodiment, the first laser device is located adjacent the driven shaft. Preferably, the laser spot will impinge the inner surface of the rim in a lower hemisphere thereof.

The wheel balancer may further include a mechanism for determining a plane location and wheel diameter of the laser spot. For example, such a mechanism may comprise an A&D arm. In this case, a second laser device may be attached to the A&D arm and movable therewith. The second laser device is operative to produce a visible marker on the inner surface of the rim for determining when the A&D arm is in a plane of the desired weight placement location. In some exemplary embodiments, the visible marker may be a line transverse to an axis of rotation of the wheel. Preferably, the second laser device is mounted such that the line will be in alignment with an outer edge of a head of the A&D arm.

In many exemplary embodiments, the first laser device may be operative to indicate an angular location for placement of the corrective weight after imbalance of the wheel has been determined. For example, the first laser device may indicate the angular location by blinking the spot as the wheel is rotated closer to the angular location. The first laser device may constantly illuminate the spot when the spot is at the angular location.

Another aspect of the present invention provides a wheel balancer for balancing a wheel having a rim and tire. The wheel balancer comprises a chassis and a driven shaft extending away from the chassis for rotating the wheel. An A&D arm, pivotal and axially extendible with respect to the chassis, is also provided. A first laser device is operable to produce a laser spot at a desired weight placement location on an inner surface of the rim. The first laser device is manipulable by an operator to move the laser spot to the desired weight placement location. A second laser device is attached to the A&D arm and movable therewith. The second laser device produces a visible marker on the inner surface of the rim for determining when the A&D arm is in a plane of the desired weight placement location.

According to a further aspect, the present invention provides a method for designating a desired weight placement location on an inside surface of a wheel rim mounted to a driven shaft of a wheel balancer. One step of the method involves directing a laser beam at the desired weight placement location to produce a laser spot thereat. Another step involves using an A&D arm of the wheel balancer to determine a plane and a diameter of the desired weight placement location while the laser spot is illuminated. Next, the wheel is spun to determine an imbalance thereof. A corrective weight is then positioned at the desired weight placement location.

A still further aspect of the invention provides a wheel balancer for balancing a wheel having a rim and tire. The wheel balancer comprises a chassis and a driven shaft extending away from the chassis for rotating the wheel. An A&D arm, pivotal and axially extendible with respect to the chassis, is also provided. A laser device is attached to the A&D arm and movable therewith. The laser device produces a visible marker on the inner surface of the rim for determining when the A&D arm is in a plane of the desired weight placement location.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
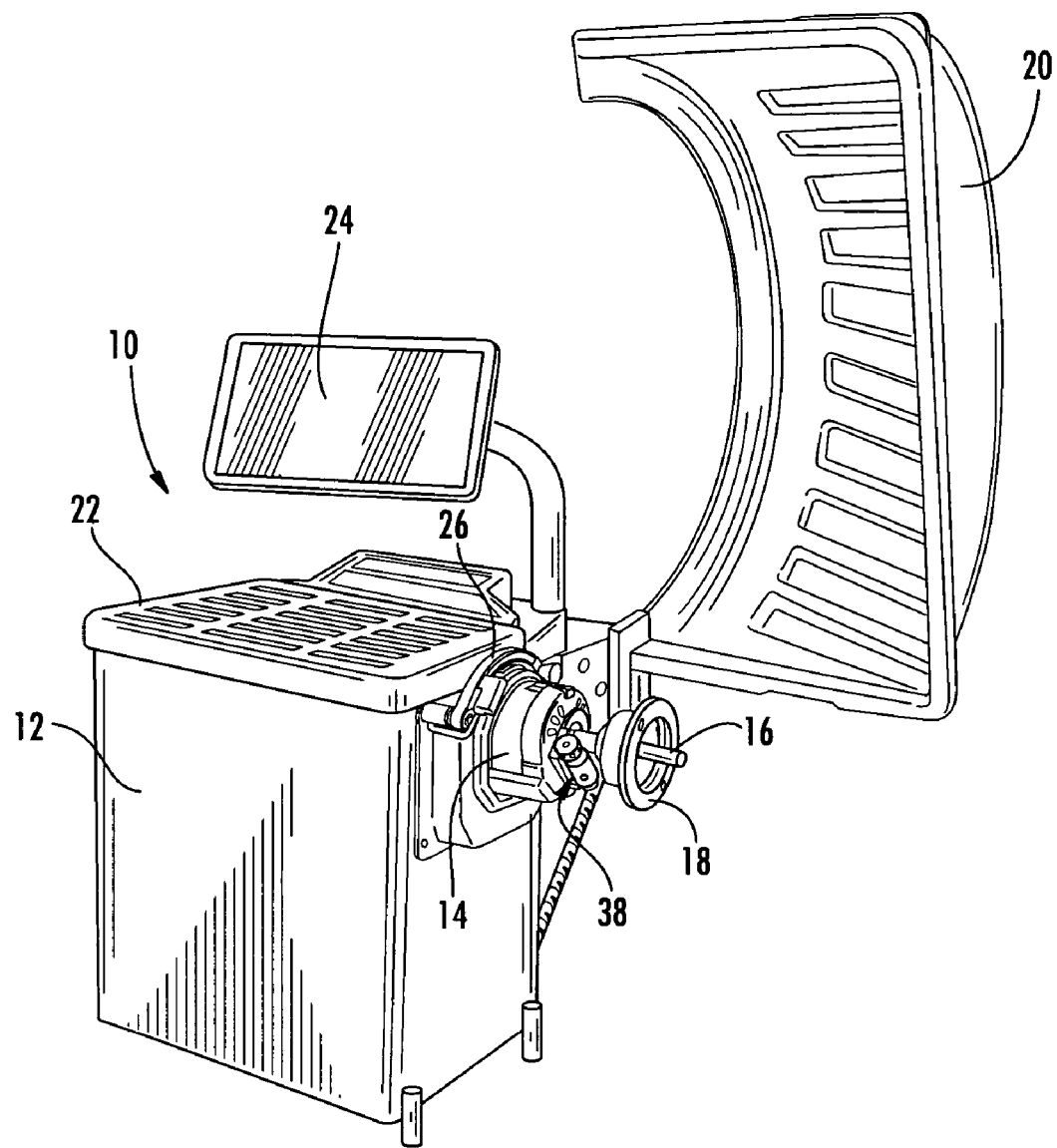
FIG. 1 is a perspective view of a wheel balancer machine in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a wheel balancer 10 in accordance with the present invention. A chassis 12 supports an electric motor 14 having a shaft 16 extending outwardly from the right side of the chassis 12. In the illustrated embodiment, a face plate 18 is attached to shaft 16 for rotation therewith. During balancing, a wheel (i.e., a tire and rim assembly) is mounted to shaft 16 in a conventional manner, such as using a back cone or pressure cup secured with a hub nut. A protective hood 20 covers the upper portions of the tire during high speed rotation of the wheel. A weight tray 22 is mounted to the top of chassis 12 so that some of the various styles and sizes of weights can be stored at the balancer 10 for use by the operator. An operator interface panel 24 is located above chassis 12, as shown.

Figure 2:
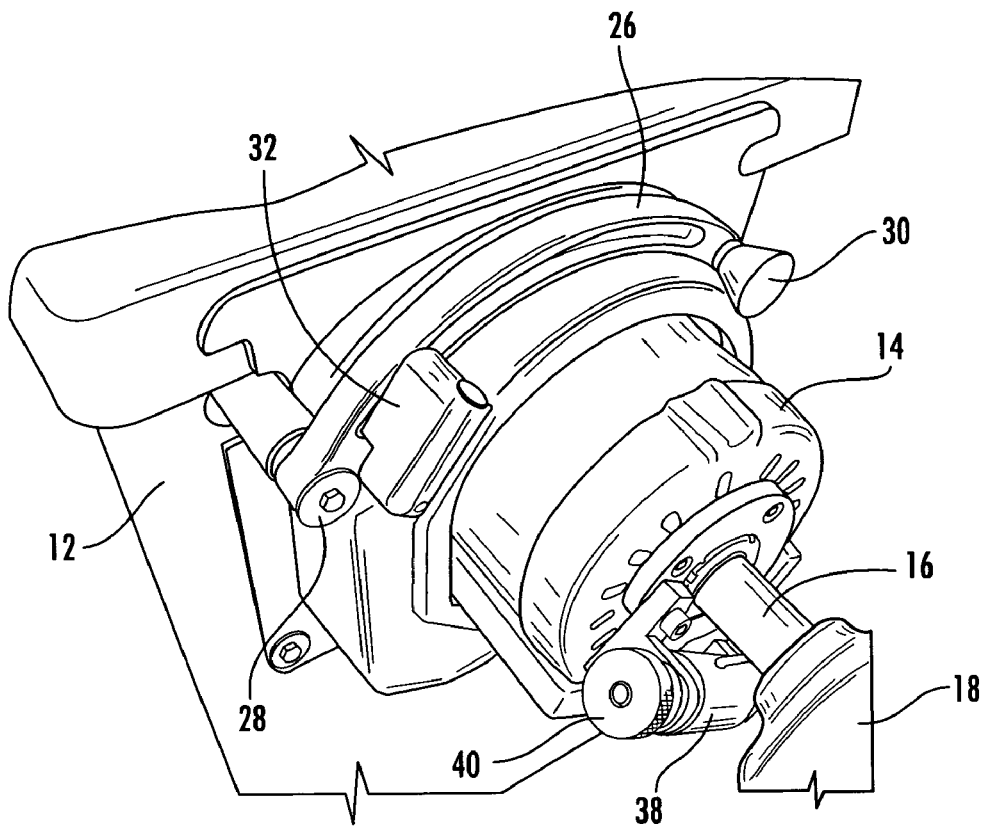
FIG. 2 is an enlarged perspective view of the drive portion of the wheel balancer of FIG. 1 showing features of the present invention.
Figure 4:
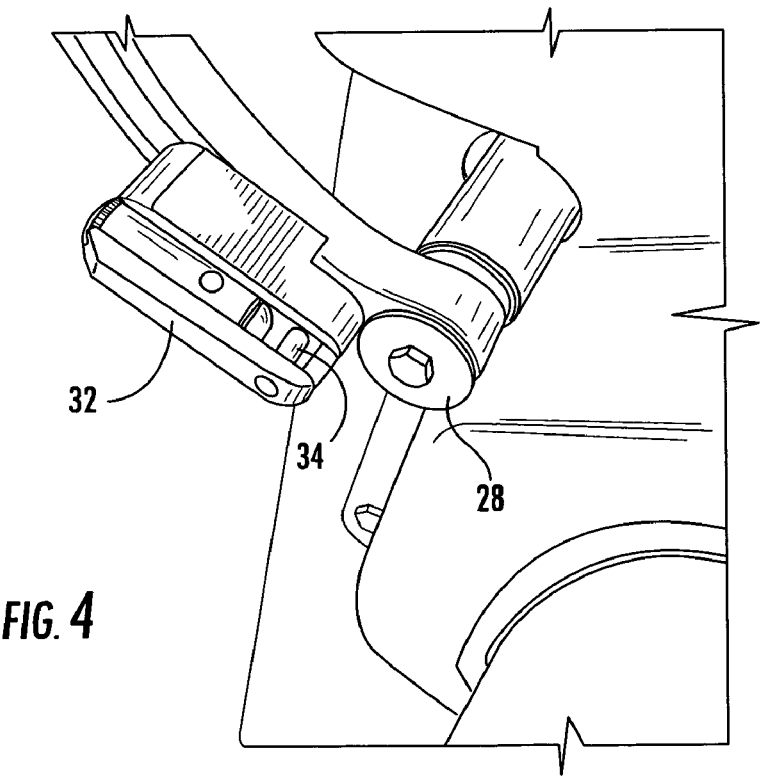
FIG. 4 is an enlarged view of the underside of the line laser.
Figure 3:
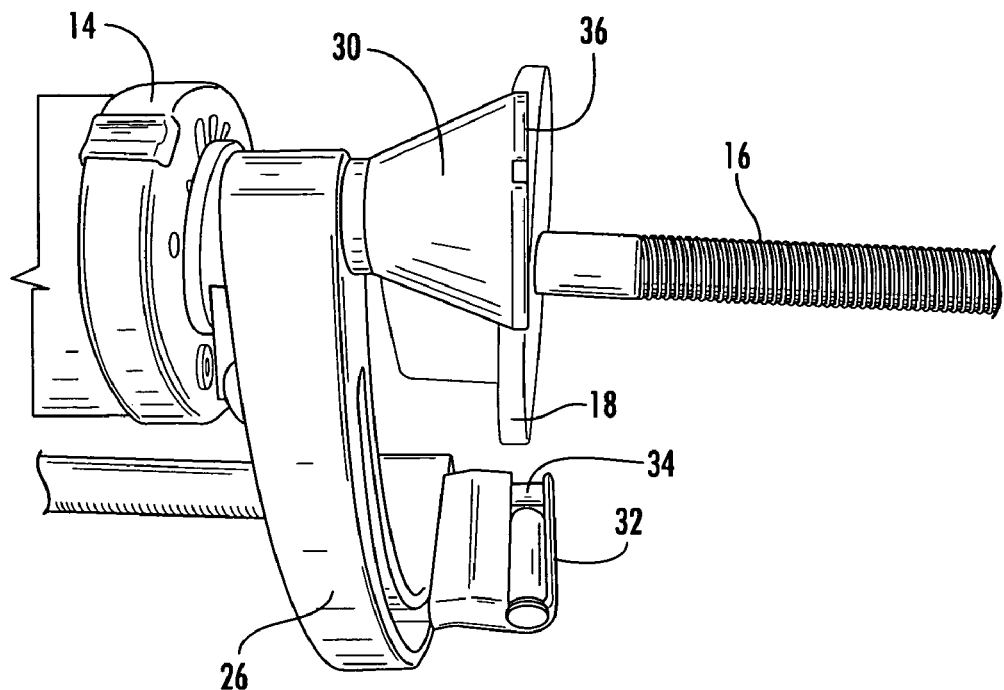
FIG. 3 shows the A&D arm rotated to reveal the underside of the line laser mounted thereto.
Figure 5:
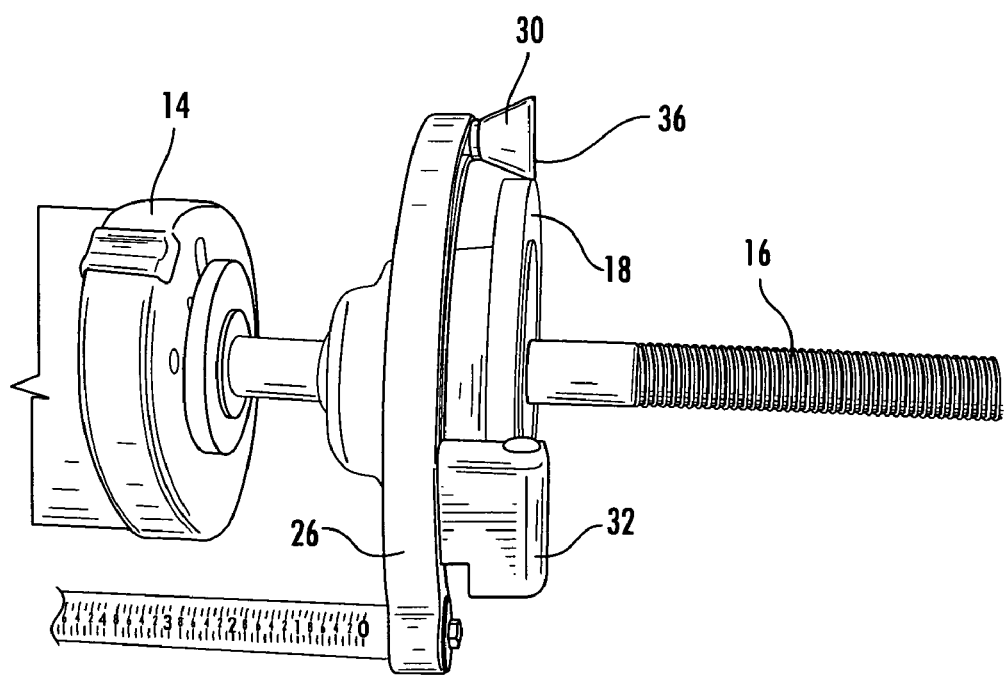
FIG. 5 shows the A&D arm partially extended to illustrate the positioning of the line laser relative to the head of the A&D arm.

Referring now also to FIG. 2, an A&D arm 26 is pivotally and extendibly attached (at 28) to the side of chassis 12 from which shaft 16 extends. As will be described in more detail below, A&D arm 26 includes a head 30 and a laser device (here in the form of line laser 32) that will produce a visual marker on the rim's inner surface. Referring now to FIGS. 3-5, one possible mounting option for laser 32 is on the side of A&D arm 26 (although many mounting options are contemplated by the present invention). Laser 32 can be activated by the operator when needed, and deactivated when not needed.

As shown in FIGS. 3 and 4, line laser 32 includes a transparent cylinder 34 located in front of the laser emitter (e.g., laser diode). When the laser's beam is activated, it travels through the transparent cylinder, which diffuses the beam to create a laser line rather than a spot. The laser line is emitted in a plane approximately aligned with the outer edge 36 of head 30. As such, line laser 32 is used to create a line around the wheel's inner surface.

Figure 6:
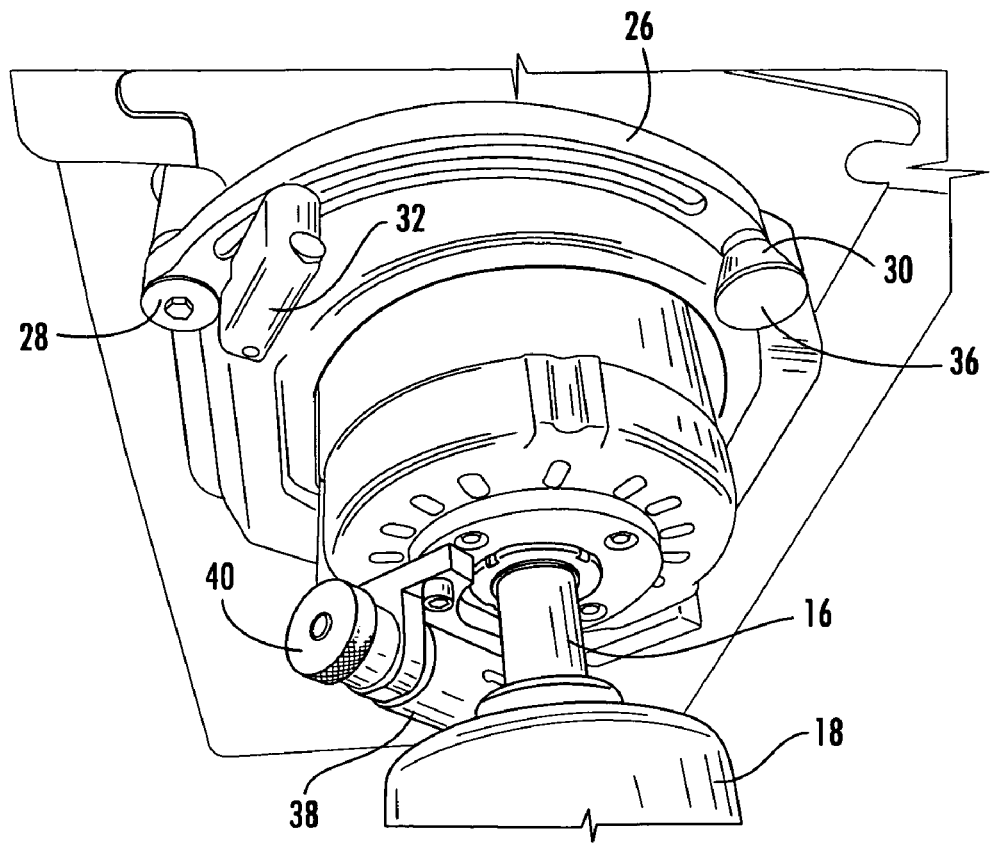
FIG. 6 is a view similar to FIG. 2.

Referring now to FIGS. 2 and 6, another laser device, here in the form of spot laser 38, is fixed relative to chassis 12. Spot laser 38 includes a positioning knob 40 for moving the beam to a desired location on the inner surface of the wheel rim. In particular, spot laser 38 is located just behind face plate 18 of the wheel spindle system in a pivotal housing so that the spot created by the laser can be adjusted on the wheel's inside surface.

When a wheel is mounted to shaft 16, spot laser 38 pivots in a plane that is in alignment with the wheel's centerline and pivots in a plane perpendicular to the rotational shaft. The pivot allows the operator to aim the beam of spot laser 38 at any point between the back of the wheel's spoke system and the inner flange of the wheel. This location at which the laser is aimed represents a plane for the location of a corrective adhesive weight.

An optional second feature enabled by the use of spot laser 38 is the ability to locate the corrective adhesive weight at a location other than 12 o'clock. Although many different locations are contemplated, spot laser 38 may be oriented to produce a spot at a position on the lower hemisphere of the inner surface of the rim (such as between four o'clock and six o'clock). At such a location, the operator can readily observe the laser's spot without undue body contortion. Also, this location provides a position where the operator can more easily clean the wheel surface area before applying the adhesive weight.

Figure 7:
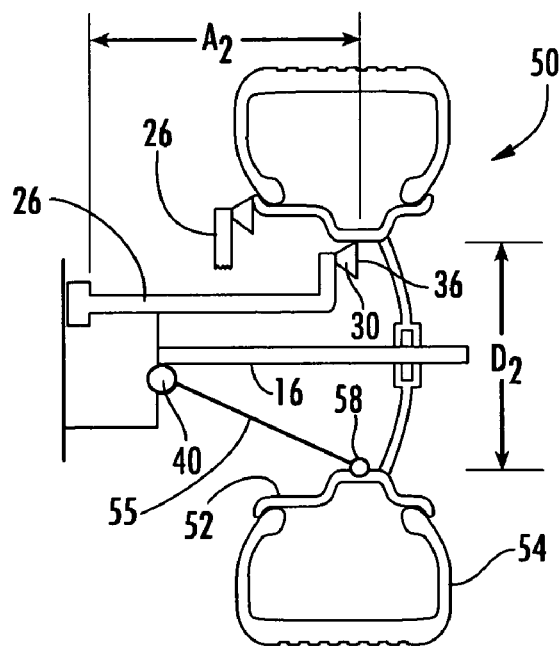
FIGS. 7 and 8 are diagrammatic representations showing use of the spot laser.
Figure 8:
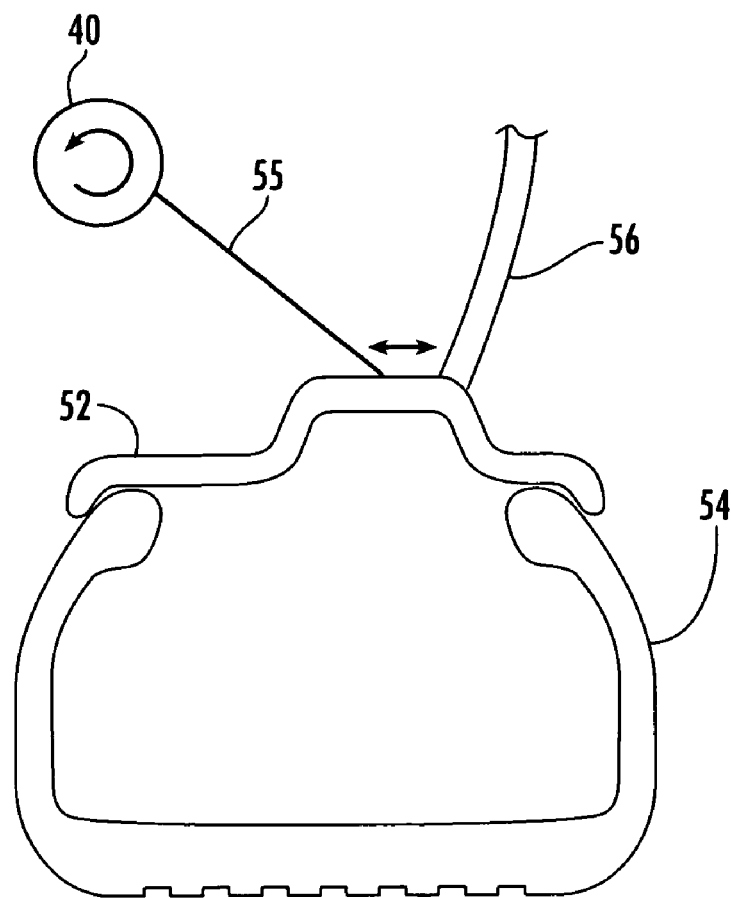
Figure 9:
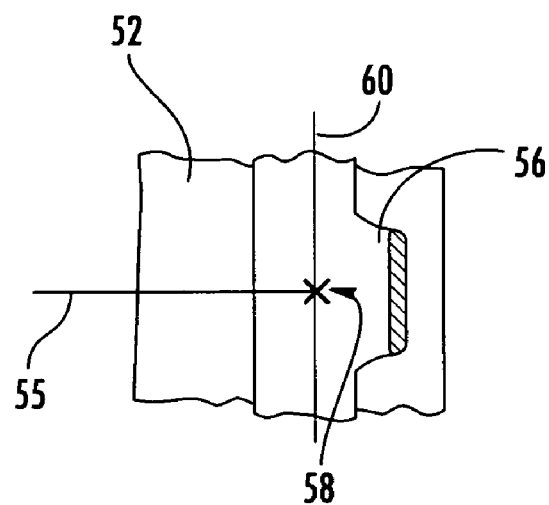
FIG. 9 shows the intersection of the beam of the line laser and the beam of the spot laser during use.

Referring now to FIG. 7-9, a representative process is described of how an embodiment of the present invention might be utilized by an operator. First, a wheel 50 (including a rim 52 and tire 54) is attached to shaft 16. Second, an operator selects a mode on the machine that enables the user to input the position of the clip-on weight for the inner flange. Next, the operator activates the machine's laser mode which causes a continuous beam 55 to be emitted by spot laser 38. After this, the operator angularly adjusts the laser's spot (using knob 40) to a desired position on the inner surface of rim 52 for placement of the adhesive corrective weight. This position might be at any location between the back side of the spokes and the inside flange of the wheel. Preferably, the operator may choose a position as far outward, or as close to the back side of the spokes, as the wheel allows. For example, the location may be hidden directly behind a spoke 56.

Next, as illustrated in FIG. 7, the operator positions A&D arm 26 at the inner flange location so that the machine can record that position (as illustrated by fragmentary arm 26). After a short time, the balancer machine will signal to the operator that the distance has been recorded. Without returning the arm to the starting operation, the operator repositions outer edge 36 of head 30 to coincide with the plane of the spot 58 created by laser 38. This alignment is readily shown when a laser line 60 emitted by line laser 32 intersects spot 58 (as shown in FIG. 9), thus ensuring that A&D arm 26 is positioned at the plane of the adhesive weight. Spot 58 may take the form of a dot, crosshair, circle or other appropriate visual marker.

One skilled in the art will appreciate that aligning laser line 60 emitted from the A&D arm with spot 58 will improve the accuracy of the A&D arm's input to the machine in determining the actual location where the adhesive weight is placed. This improvement in accuracy will enable the operator to achieve a one spin balance a greater percentage of the time. Once again, the operator holds arm 26 at this position until the machine indicates that the machine has recorded this second position (having plane location $A_2$ and diameter $D_2$).

With the two planes for weight placement now recorded by the balancer machine, the operator activates the machine to spin the wheel in order to allow the machine to sense the tire/rim imbalance and compute the amount of corrective weight needed in each plane. Once the tire has stopped rotating from the spin cycle, the operator rotates the wheel to the radial location for the clip weight as displayed on the balancer machine. The operator then applies a clip-on weight in the correct amount at the 12 o'clock position of the inner plane. Next, the operator begins to rotate the tire for the position of the adhesive weight. As the wheel approaches the correct radial position for the adhesive weight, spot laser 38 begins to blink. As the radial position approaches the correct radial location, laser 38 blinks faster until it emits a continuous beam at the precise location to situate the weight. The operator then adheres the adhesive weight such that the laser's spot 58 is at the center. A check spin may be performed to ensure the proper balancing of the wheel.

In addition to assisting the operator in placing the adhesive weights, spot laser 38 can be used to determine if the wheel rim has been damaged or is bent to a degree where closer inspection is warranted. To perform this inspection, laser 38 can be aimed at a location near the edge of the wheel. The operator then manually rotates the wheel and observes the spot's location as compared to the edge of the wheel. This inspection allows for quick visual inspection for lateral run-out and to confirm that the wheel is properly centered on the centering cone.

Optionally, the present invention could include an additional laser mounted to the machine's cabinet (or to another fixed surface) and aimed to emit a beam in a direction parallel to the mounting shaft's center axis. Pointing the spot from this laser at the wheel's flange and then rotating the wheel would allow the operator to observe any lateral run-out of the wheel. In addition, this laser would enable the operator to ensure that the wheel is centered correctly on the balancer.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed is:

1. A wheel balancer for balancing a wheel having a rim and tire, said wheel balancer comprising:
   a chassis;
   a driven shaft extending away from said chassis for rotating the wheel;
   a first laser device mounted at a fixed location relative to said chassis;
   said first laser device being operable to produce a laser spot at a desired weight placement location on an inner surface of the rim;
   an A&D arm; and
   a second laser device attached to said A&D arm and movable therewith, said second laser device producing a visible marker on said inner surface of the rim for determining when said A&D arm is in a plane of the desired weight placement location.

2. A wheel balancer as set forth in claim 1, said first laser device being manipulable by an operator to move said laser spot to said desired weight placement location.

3. A wheel balancer as set forth in claim 2, wherein said first laser device includes a rotatable adjustment knob for moving said laser spot.

4. A wheel balancer as set forth in claim 2, wherein said first laser device is located adjacent said driven shaft.

5. A wheel balancer as set forth in claim 2, wherein said laser spot will impinge said inner surface of said rim in a lower hemisphere thereof.

6. A wheel balancer as set forth in claim 1, wherein said wheel balancer further includes a mechanism for determining a wheel diameter of said laser spot.

7. A wheel balancer as set forth in claim 6, wherein said mechanism comprises said A&D arm.

8. A wheel balancer as set forth in claim 1, wherein said visible marker is a line transverse to an axis of rotation of said wheel.

9. A wheel balancer as set forth in claim 8, wherein said second laser device is mounted such that said line will be in alignment with an outer edge of a head of said A&D arm.

10. A wheel balancer as set forth in claim 1, wherein said first laser device is operative to indicate an angular location for placement of said corrective weight after imbalance of said wheel has been determined.

11. A wheel balancer as set forth in claim 10, wherein said first laser device indicates said angular location by blinking said spot as said wheel is rotated such that said spot is closer to said angular location.

12. A wheel balancer as set forth in claim 11, wherein said first laser device constantly illuminates said spot when said spot is at said angular location.

13. A wheel balancer for balancing a wheel having a rim and tire, said wheel balancer comprising:
   a chassis;
   a driven shaft extending away from said chassis for rotating the wheel;
   an A&D arm being pivotal and axially extendible with respect to said chassis;
   a first laser device operable to produce a laser spot at a desired weight placement location on an inner surface of the rim, said first laser device being manipulable by an operator to move said laser spot to said desired weight placement location; and
   a second laser device attached to said A&D arm and movable therewith, said second laser device producing a visible marker on the inner surface of the rim for determining when said A&D arm is in a plane of the desired weight placement location.

14. A wheel balancer as set forth in claim 13, wherein said visible marker is a line transverse to an axis of rotation of said wheel.

15. A wheel balancer as set forth in claim 14, wherein said second laser device is mounted such that said line will be in alignment with an outer edge of a head of said A&D arm.

16. A wheel balancer as set forth in claim 13, wherein said first laser device includes a rotatable adjustment knob for moving said laser spot.

17. A wheel balancer as set forth in claim 16, wherein said first laser device is located adjacent said driven shaft.

18. A wheel balancer as set forth in claim 13, wherein said laser spot will impinge said inner surface of said rim in a lower hemisphere thereof.

* * * * *